(12) United States Patent
Helvick

(10) Patent No.: US 8,655,382 B2
(45) Date of Patent: Feb. 18, 2014

(54) WIRELESS EVENT NOTIFICATION SYSTEM AND METHODS FOR USE THEREIN

(75) Inventor: Richard Eric Helvick, Portland, OR (US)

(73) Assignee: Sharp Laboratories of America, Inc., Camas, WA (US)

( * ) Notice: Subject to any disclaimer, the term of this patent is extended or adjusted under 35 U.S.C. 154(b) by 1026 days.

(21) Appl. No.: 12/082,267

(22) Filed: Apr. 10, 2008

(65) Prior Publication Data

US 2009/0258636 A1 Oct. 15, 2009

(51) Int. Cl.
*H04W 24/00* (2009.01)

(52) U.S. Cl.
USPC .................. 455/456.3; 455/404.1; 455/414.2; 455/466; 455/521; 455/567; 709/206; 709/207

(58) Field of Classification Search
USPC .............. 455/456.3, 414.2, 466, 404.01, 567, 455/521; 709/206, 207
See application file for complete search history.

(56) References Cited

U.S. PATENT DOCUMENTS

| | | | |
|---|---|---|---|
| 6,509,833 B2 | 1/2003 | Tate | 349/539.1 |
| 6,553,100 B1 * | 4/2003 | Chen et al. | 379/37 |
| 6,618,716 B1 * | 9/2003 | Horvitz | 706/55 |
| 6,745,021 B1 | 6/2004 | Stevens | 455/404.1 |
| 6,842,774 B1 | 1/2005 | Piccioni | 709/207 |
| 2005/0164710 A1 * | 7/2005 | Beuck | 455/456.1 |
| 2005/0221866 A1 | 10/2005 | Huang et al. | 455/567 |
| 2006/0206568 A1 | 9/2006 | Verma et al. | 709/206 |
| 2006/0223492 A1 | 10/2006 | Chin et al. | 455/404.1 |
| 2009/0043621 A1 * | 2/2009 | Kershaw | 705/7 |

* cited by examiner

*Primary Examiner* — Nimesh Patel
(74) *Attorney, Agent, or Firm* — Scot A. Reader

(57) ABSTRACT

A wireless event notification system that selectively notifies members of events based on their location and/or interests, and devices and method for use therein. The wireless event notification system provides single or multifactor filtering based on one or more of proximity to an event, membership in a subgroup to which an event pertains and/or desire to receive events at the severity level of an event. Superfluous notifications are thereby reduced. Location-based filtering may be done by a notification server device to which member locations are reported or, to enhance member privacy, by wireless client devices using unreported member locations. Additionally, in some embodiments, wireless client devices are distributed by a system administrator to members after the system administrator has registered the members with the system to remove device acquisition, device compatibility and member registration hurdles that can present obstacles to universal participation in the system.

14 Claims, 6 Drawing Sheets

WIRELESS EVENT NOTIFICATION SYSTEM AND METHODS FOR USE THEREIN

BACKGROUND OF THE INVENTION

The present invention relates to wireless event notification and, more particularly, to a wireless event notification system that selectively notifies members of a wireless event notification system of events based on their location and/or interests, and devices and methods for use therein.

In recent years, many schools and corporations have established wireless event notification systems. Administrators of these systems broadcast event notifications, such as emergency alerts, to wireless communication devices carried by members of the system, such as students or employees. These wireless communication devices may include mobile phones, laptop computers or personal data assistants (PDA), for example.

Known wireless event notification systems have certain shortcomings. First, in order to take advantage of some systems the student or employee must volunteer to buy a wireless communication device of the type supported by the system. A student or employee may be hesitant to incur the cost and expense to acquire a device of the type supported by the system. Second, the student or employee often must proactively register with the system. Many students or employees will forget, or not take the time, to register. Third, such systems are typically over-inclusive when transmitting event notifications. Many students or employees who, due to their present location or particular interests, are not affected by an event still receive a notification. The receipt of superfluous notifications can be a nuisance and lead students or employees to inadvertently disregard notifications of other events that do affect them.

SUMMARY OF THE INVENTION

The present invention, in a basic feature, provides a wireless event notification system that selectively notifies members of events based on their location and/or interests, and devices and methods for use therein. The wireless event notification system provides single or multifactor filtering based on one or more of proximity to an event, membership in a subgroup to which an event pertains and/or desire to receive events at the severity level of an event. Superfluous notifications are thereby reduced. Location-based filtering may be done by a notification server device to which member locations are reported or, to enhance member privacy, by wireless client devices using unreported member locations. Additionally, in some embodiments, wireless client devices are distributed by a system administrator to members after the system administrator has registered the members with the system to remove device acquisition, device compatibility and member registration hurdles that can present obstacles to universal participation in the system.

In one aspect of the invention, a notification server device for use in a wireless event notification system comprises a network interface, a memory storing member profiles for members of the system and a processor communicatively coupled with the network interface and the memory, wherein in response to an event notification request having an event descriptor for an event, under control of the processor the server device identifies based at least in part on the event descriptor and the member profiles a subset of the members to receive notification of the event and transmits via the network interface event notification messages addressed to wireless client devices associated with the subset of the members.

In some embodiments, the server device identifies the subset based at least in part on locations reported to the server device by the client devices and stored in member profiles.

In some embodiments, the server device identifies the subset based at least in part on notification subgroups stored in member profiles.

In some embodiments, the server device identifies the subset based at least in part on event severity thresholds stored in member profiles.

In some embodiments, message text in the event notification messages varies based on proximity of an event location in the event descriptor to the reported locations.

In some embodiments, the event notification messages comprise Short Message Service (SMS) messages.

In some embodiments, the event notification messages comprise Multimedia Message Service (MMS) messages.

In some embodiments, the event notification messages are carried in Internet Protocol (IP) packets.

In some embodiments, each member profile is uniquely associated with a member of the system and a wireless client device, and each member profile is created in the memory before the client device associated with the member profile is distributed to the member associated with the member profile.

In some embodiments, in response to a location report received on the network interface from a wireless client device, under control of the processor the server device identifies a member profile associated with the client device and updates a location in the identified member profile.

In another aspect of the invention, a wireless client device for use in a wireless event notification system comprises a user interface, one or more wireless interfaces and a processor communicatively coupled with the user interface and the wireless interfaces, wherein under control of the processor the client device determines a location of the client device based at least in part on information received via at least one of the wireless interfaces and applies the location to regulate display on the user interface of remotely generated event notification messages.

In some embodiments, the client device regulates display on the user interface of remotely generated event notification messages at least in part by transmitting under control of the processor to a remote notification server device via at least one of the wireless interfaces a location report having the location, whereby the server device selectively inhibits based at least in part on the location transmission of event notification messages to the client device.

In some embodiments, the client device regulates display on the user interface of remotely generated event notification messages at least in part by selectively inhibiting under control of the processor based at least in part on the location display on the user interface of event notification messages received from a remote notification server device via at least one of the wireless interfaces.

In some embodiments, the information received via the at least one wireless interface comprises global positioning system (GPS) position information.

In some embodiments, the information received via the at least one wireless interface comprises position information received from a cellular base station.

In some embodiments, the information received via the at least one wireless interface comprises position information received from a wireless local area network (LAN) access point.

In yet another aspect of the invention, a method for selectively notifying members of a wireless event notification system of events comprises the steps of receiving information, determining a location of a wireless client device based at least in part on the information and regulating display on the client device of remotely generated event notification messages based at least in part on the location.

In some embodiments, the regulating step comprises transmitting the location to a remote device whereby the remote device selectively inhibits transmission of remotely generated event notification messages based at least in part on the location.

In some embodiments, the regulating step comprises selectively inhibiting based at least in part on the location display on the client device of remotely generated event notification messages received on the client device.

These and other aspects of the invention will be better understood by reference to the following detailed description taken in conjunction with the drawings that are briefly described below. Of course, the invention is defined by the appended claims.

DETAILED DESCRIPTION OF A PREFERRED EMBODIMENT

Figure 1:
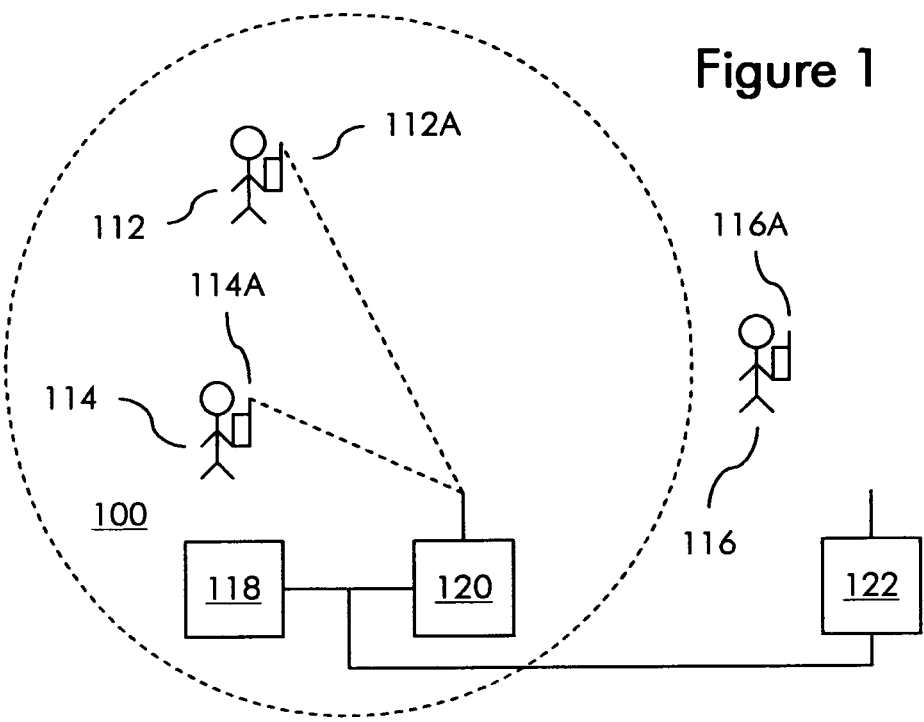
FIG. 1 shows a wireless event notification system with location-based filtering by a notification server device in some embodiments of the invention.

FIG. 1 shows a wireless event notification system wherein location-based filtering is performed by a notification server device 118. In these embodiments, members 112, 114, 116 are selectively notified of system events via event notification messages originating on an event notification server device 118 and received and displayed on wireless client devices 112A, 114A, 116A carried by members 112, 114, 116. Client devices 112A, 114A, 116A may be cellular phones, laptop computers or PDA, for example. Whether members 112, 114, 116 are notified or not of a given event depends on the last location of members 112, 114, 116 reported to server device 118 by client devices 112A, 114A, 116A. Server device 118 and client devices 112A, 114A, 116A communicate via wireless access devices 120, 122, which may be cellular base stations or Institute of Electrical and Electronics Engineers (IEEE) 802.11 wireless local area network (LAN) access points, for example. Members 112, 114, 116 have respective member profiles stored on server device 118. These member profiles are uniquely associated with members 112, 114, 116 and include addresses of client devices 112A, 114A, 116A that are also uniquely associated with members 112, 114, 116. The addresses may be telephone numbers or IP addresses, for example. Member profiles also include the last location of members 112, 114, 116 as reported by their respective client devices 112A, 114A, 116A. The event notification messages may be SMS messages, MMS messages or messages carried in IP packets, for example. The system may be an emergency alert system for a school, in which case members 112, 114, 116 may be students and school employees, or the system may be an emergency alert system for a corporation, in which case members 112, 114, 116 may be corporate employees, or the system may be another type of emergency or non-emergency notification system.

Continuing with the embodiments of FIG. 1, server device 118 receives an event notification request from an event notification system administrator. The event notification request includes an event descriptor that has an event location, a notification radius and message text. Server device 118 compares elements of the event descriptor with member profiles stored on server device 118 and identifies a subset of members 112, 114, 116, specifically members 112, 114, to notify of the event. Members 112, 114 are identified to receive notice of the event because the last location of members 112, 114 as reported by their respective client devices 112A, 114A and stored in their respective member profiles is within a notification zone 100 delimited by the event location and notification radius in the event descriptor. Server device 118 transmits event notification messages having the message text from the event descriptor to client devices 112A, 114A via access device 120 using addresses stored in member profiles for the identified members 112, 114. The last reported location of member 116 is outside notification zone 116 and therefore member 116 not notified of the event.

Figure 2:
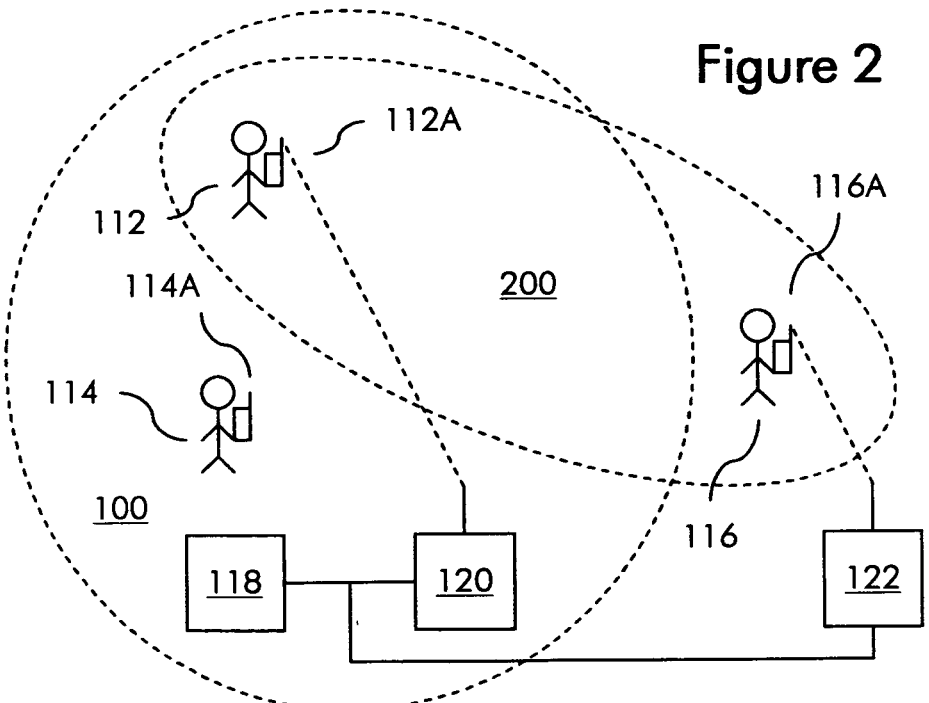
FIG. 2 shows a wireless event notification system with notification subgroup-based filtering in some embodiments of the invention.

FIG. 2 shows a wireless event notification system wherein server device 118 performs notification subgroup-based filtering in other embodiments of the invention. In these embodiments, whether members 112, 114, 116 are notified or not of a given event depends on whether members 112, 114, 116 are registered in a notification subgroup to which the event pertains. Member profiles in these embodiments include addresses of client devices 112A, 114A, 116A as well as one or more notification subgroups to which members 112, 114, 116 belong. Notification subgroups may consist, for example, of members with shared vocational, academic or social interests.

Continuing with the embodiments of FIG. 2, server device 118 receives an event notification request from an event notification system administrator. The event notification request includes an event descriptor having a notification subgroup identifier and message text. Server device 118 compares elements of the event descriptor with member profiles and identifies a subset of members 112, 114, 116, specifically members 112, 116, to notify of the event. Members 112, 116 are identified to receive notice of the event because their respective member profiles indicate membership in the notification subgroup 200 identified in the event descriptor. Server device 118 transmits event notification messages having the message text from the event descriptor to client devices 112A, 116A via access devices 120, 122 using addresses stored in member profiles for the identified members 112, 116.

In other embodiments, a wireless event notification system supports event severity-based filtering by server device 118. In these embodiments, whether members 112, 114, 116 are notified or not of a given event depends on whether members 112, 114, 116 are registered to receive events of the severity level of the given event. Member profiles include addresses of client devices 112A, 114A, 116A as well as respective severity thresholds. The severity thresholds specify minimum severity levels for an event in order for members 112, 114, 116, respectively, to be notified of the event. Event severity levels are specified in the event descriptors of event notification requests.

In still other embodiments, a wireless event notification system supports multifactor filtering by server device 118. In these embodiments, whether members 112, 114, 116 are notified or not of a given event depends on whether the given event has multiple characteristics matching their respective member profiles. For example, member profiles may in these embodiments include addresses of client devices 112A, 114A, 116A as well as respective last reported locations, notification subgroups and severity thresholds, and server device 118 may require a tripartite match between the event descriptor and the member profiles based on location, notification subgroup and severity in order to identify a member to the subset notified of the event.

In some embodiments, the message text in event notification messages transmitted to client devices 112A, 114A, 116A varies based on the proximity of the event location specified in the event descriptor to the last reported locations in the member profiles Thus, for example, a member inside Building X that is experiencing an adverse event may receive an event notification message that reads "Evacuate Building X immediately" whereas another member within the notification zone but farther away from the event may receive an event notification message that reads "Please avoid Building X."

Figure 3:
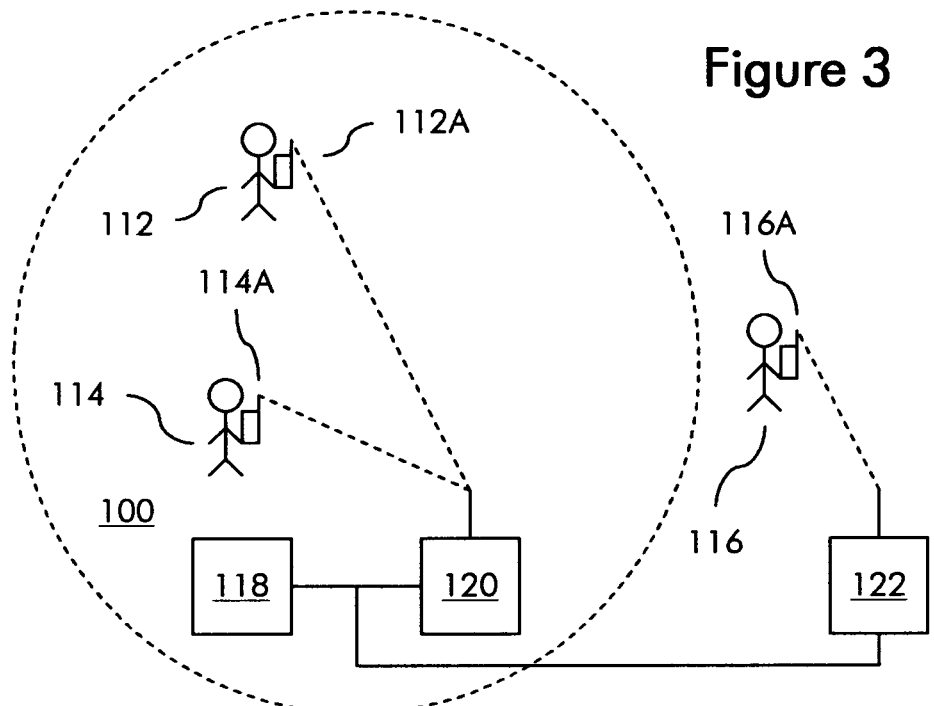
FIG. 3 shows a wireless event notification system with location-based filtering by wireless client devices in other embodiments of the invention.

FIG. 3 shows a wireless event notification system wherein location-based filtering is performed by client device 116A in other embodiments of the invention. In these embodiments, client devices 112A, 114A, 116A discover their own locations but do not report them to server device 118 in order to maintain greater member privacy. Server device 118 receives an event notification request from an event notification system administrator. The event notification request has an event descriptor that includes message text, an event location and a notification radius. Because client devices 112A, 114A, 116A have not reported their locations, server device 118 transmits event notification messages having the message text, event location and notification radius to all client devices 112A, 114A, 116A via access devices 120, 122 using addresses stored in member profiles for all members 112, 114, 116. Client devices 112A, 114A, 116A individually compare the event location and notification radius in the received event notification messages with their most recently discovered (and unreported) locations and individually determine whether devices 112A, 114A, 116A are within notification zone 100 delimited by the event location and notification radius. More particularly, devices 112A, 114A determine that they are within notification zone 100 whereas device 116A determines that it is outside notification zone 100. Devices 112A, 114A accordingly display the message text from their received event notification messages while device 116A inhibits display of its received event notification message.

In other embodiments, members 112, 114, 116 may individually choose whether or not to have their respective client devices 112A, 114A, 116A report their locations to server device 118. In these embodiments, server device 118 performs location-based filtering for members 112, 114, 116 who elect to report their locations whereas client devices 112A, 114A, 116A perform location-based filtering for members 112, 114, 116 who decide not to report their locations.

Figure 4:
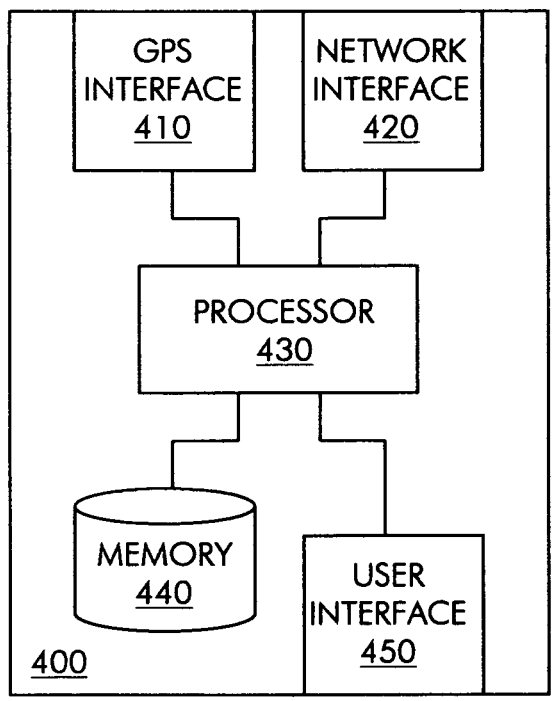
FIG. 4 shows a wireless client device in some embodiments of the invention.

FIG. 4 shows a wireless client device 400 in some embodiments of the invention. Client device 400 includes a multiple of wireless interfaces, including a GPS interface 410 and a network interface 420, as well as a memory 440 and a user interface 450, all of which are communicatively coupled with a processor 430. GPS interface 410 receives position information from GPS satellites and passes the position information to processor 430. Network interface 420 transmits and receives information on wireless links established with access devices. Network interface 420 may be, for example, a cellular network interface, a wireless LAN (e.g. Wi-Fi) interface or a wireless wide area network (WAN) (e.g. WiMAX) interface. User interface 450 receives inputs from the member who possesses client device 400 via one or more input devices and displays outputs to the member via one or more output devices. Output devices include a display, such as a liquid crystal display (LCD), light emitting diode (LED) display, which is adapted to display message text from event notification messages. Input devices include, for example, a finger or stylus-operated touch screen, a scroll wheel or ball, a keypad and/or voice command module, which is/are adapted to receive member preferences, such as a preference indicating whether or not to report the location of client device 400 to an event notification server device. Processor 430 executes in software operations supported by client device 400, including establishment, tear-down and management of wireless links via network interface 420, determining location (e.g. latitude, longitude, altitude) based on position information received via GPS interface 410, generating and transmitting location reports if authorized by member preferences and displaying, as appropriate, message text from event notification messages. Memory 440 stores software executable by processor 430. Memory 440 includes one or more random access memories (RAM) and one or more read only memories (ROM).

Figure 5:
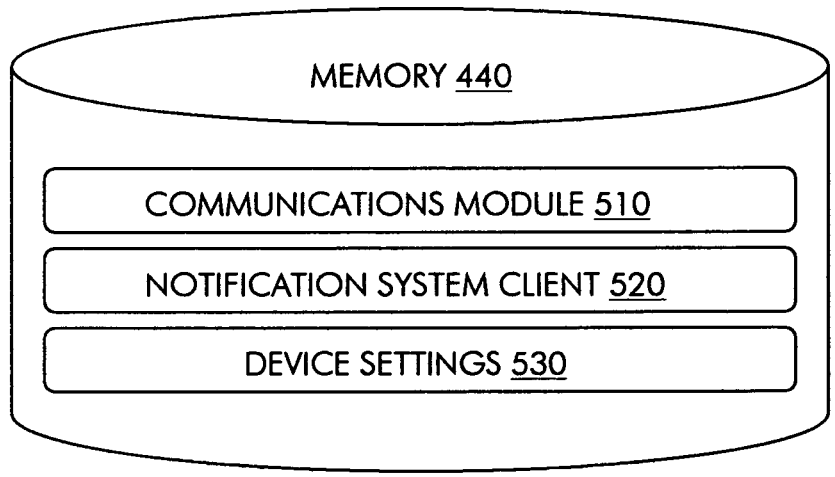
FIG. 5 shows functional elements of the client device of FIG. 4.

FIG. 5 shows functional elements of client device 400 in more detail to include a communications module 510, a notification system client 520 and device settings 530. Communications module 510 has instructions executable by processor 430 to establish, manage and tear-down connections to access devices via network interface 420. Notification system client 520 has instructions executable by processor 430 to discover the location of client device 400 and process event notification messages received on client device 400. Client 520 also has instructions executable by processor 430, if the member who possesses client device 400 elects to allow location reporting, to generate and transmit location reports to an event notification server device. Client 520 also has instructions executable by processor 430, if the member who possesses client device 400 elects not to allow location reporting, to inhibit based on the unreported location of client device 400 display of event notification messages received from an event notification server device for which client device 400 is not in the notification zone. Memory 440 also includes device settings 530 that indicate member preferences, such as whether location reporting is enabled or disabled.

Figure 6:
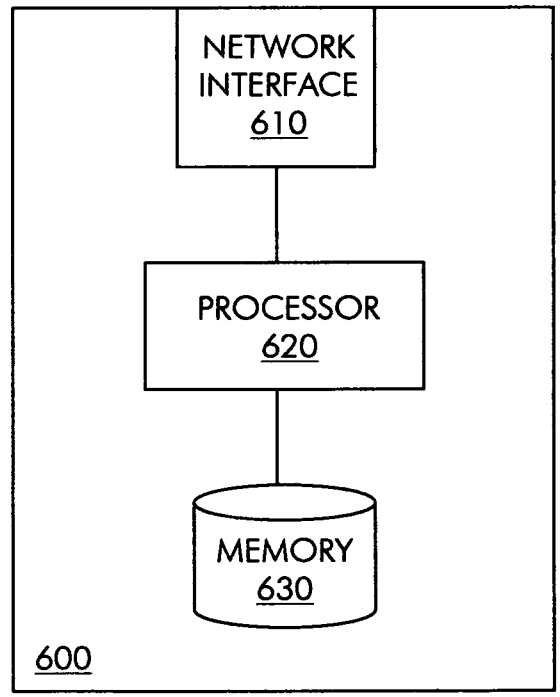
FIG. 6 shows a notification server device in some embodiments of the invention.

FIG. 6 shows a notification server device 600 in some embodiments of the invention. Server device 600 has a network interface 610 and a memory 630, both of which are communicatively coupled with a processor 620. Network interface 610 transmits and receives information to/from a notification system administrator and access devices via wired connections. Network interface 610 may be, for example, a telephony interface or a wired LAN (e.g. Ethernet) interface. Processor 620 executes in software operations supported by server device 600, including establishment, teardown and management of wired connections via network interface 610 and processing registration requests, location reports and event notification requests. Memory 630 stores software executable by processor 620. Memory 630 includes RAM and ROM.

Figure 7:
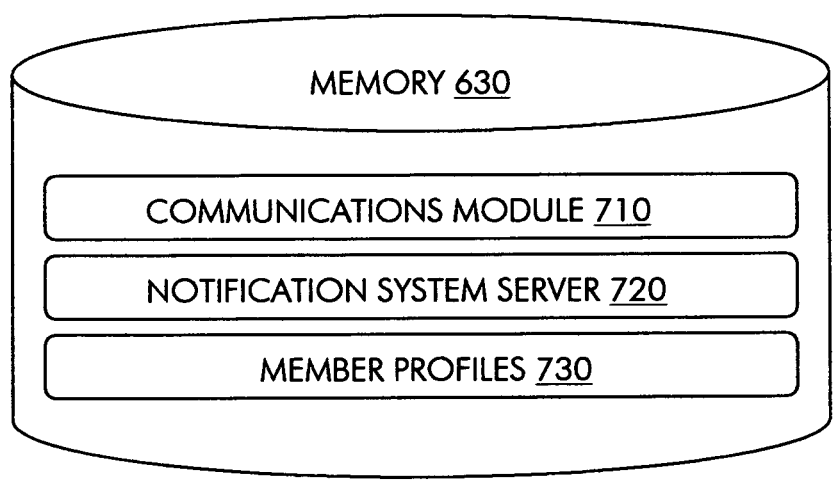
FIG. 7 shows functional elements of the server device of FIG. 6.

FIG. 7 shows functional elements of server device 600 in more detail to include a communications module 710, a notification system server 720 and member profiles 730. Communications module 710 has instructions executable by processor 620 to establish, manage and tear-down connections via network interface 610. Notification system server 720 has instructions executable by processor 620 process registration requests and location reports received on server device 600. Server 720 also has instructions executable by processor 620 to process event notification requests received on server device 600, including generating and transmitting event notification messages to wireless client devices based on member profiles 730 stored in memory 630. Member profiles 730 include, for each member of the event notification system, a profile having an address of a wireless client device distributed to the member and one or more of the following: last reported location, one or more notification subgroups and a severity threshold.

Figure 8:
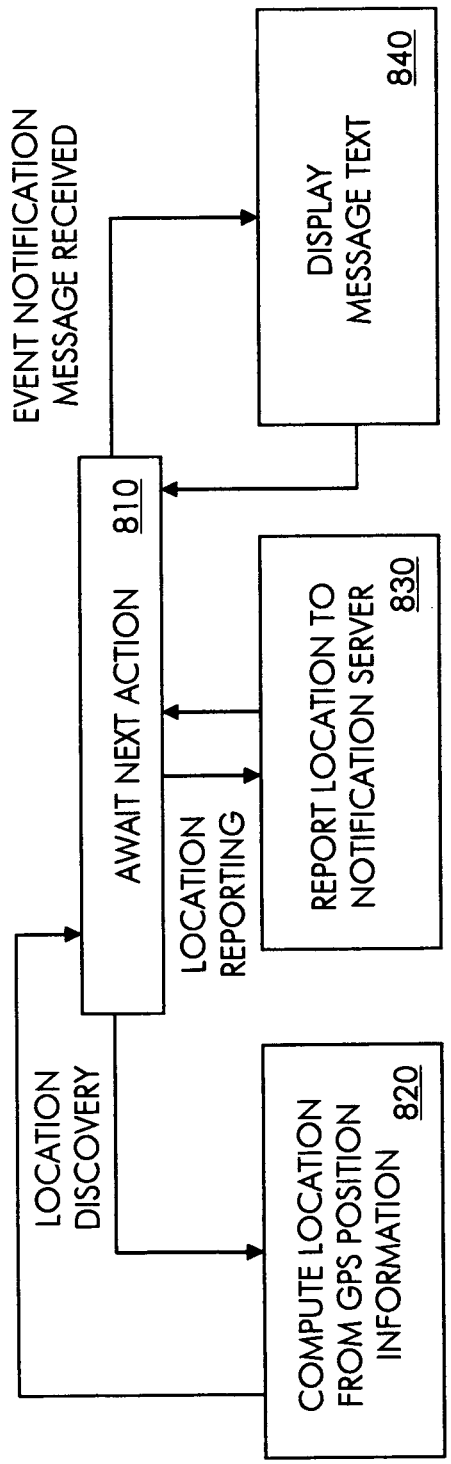
FIG. 8 shows a method performed by a wireless client device in some embodiments of the invention.

FIG. 8 shows a method performed by client device 400 in some embodiments of the invention. In the illustrated method, location reporting is enabled on client device 400 such that a notification server device is responsible for location-based filtering. Client device 400 begins in a listening state where it awaits the next action (810). If the next action is location discovery, client device 400 determines its location from GPS position information (820) and awaits the next action (810). In other embodiments, rather than determining its location from GPS position information, client device 400 may determine its location based on configured position information provided by an access device to which client device 400 has established a wireless link. If the next action is location reporting, client device 400 generates a location report having its most recently determined location, transmits the location report to a notification server device (830) and awaits the next action (810). If the next action is receipt of an event notification message, client device 400 displays message text from the event notification message (840) and awaits the next action (810).

Figure 9:
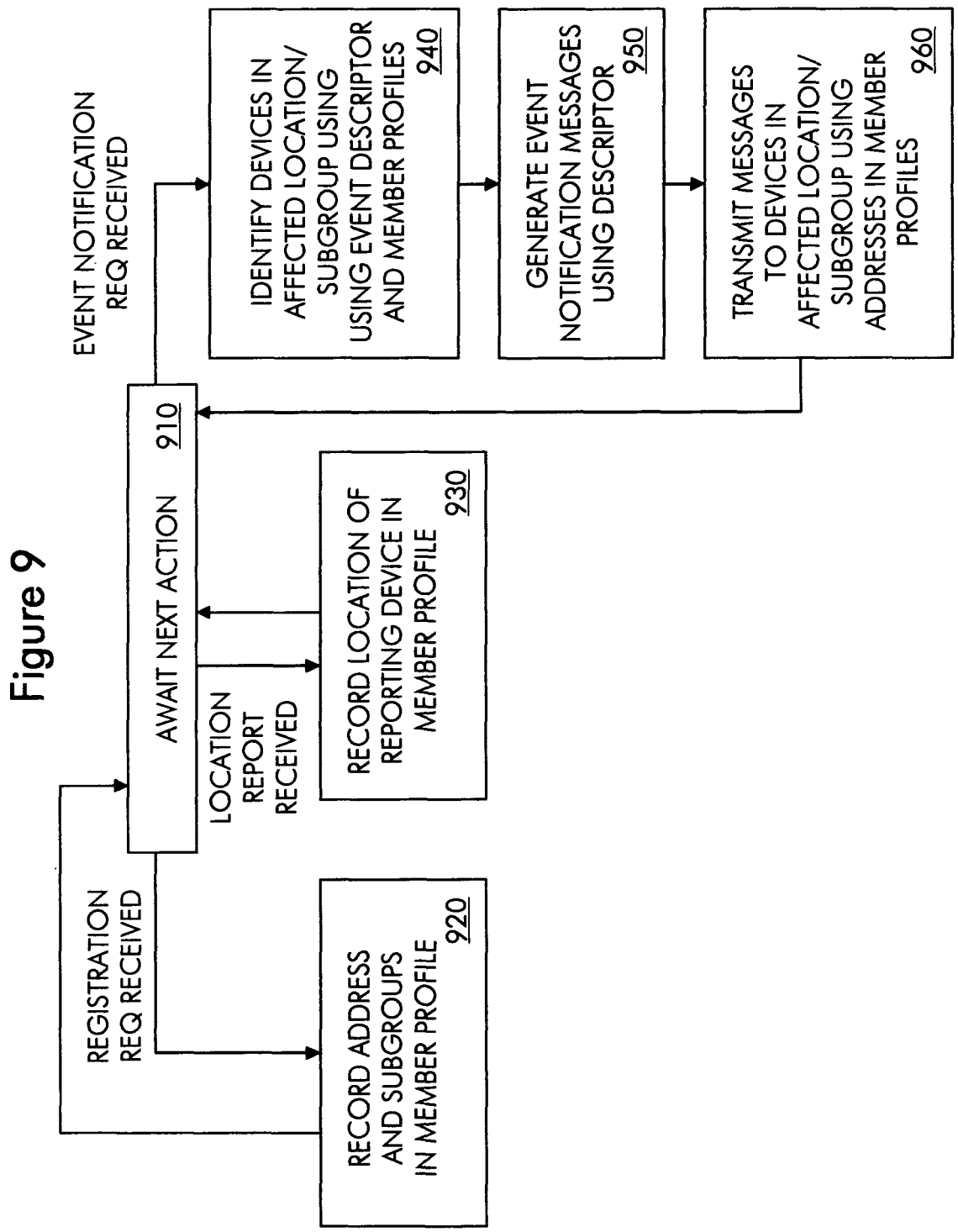
FIG. 9 shows a method performed by a notification server device in some embodiments of the invention.

FIG. 9 shows a method performed by notification server device 600 in some embodiments of the invention. In the illustrated method, location reporting is enabled on wireless client devices such that server device 600 is responsible for location-based filtering. Additionally, multifactor filtering based on location and notification subgroup is operative. Server device 600 begins in a listening state where it awaits the next action (910). If the next action is receipt of a registration request from the event notification system administrator, server device 600 adds a new member profile that includes the address and subgroup of the new member (920) and awaits the next action (910). If the next action is receipt of a location report from a wireless client device, server device 600 updates the lost reported location in the member profile of the reporting member with the location specified in the received location report (930) and awaits the next action (910). If the next action is receipt of an event notification request from the system administrator, server device 600 identifies using the event descriptor in the event notification request and member profiles 730 members that are in both the event notification zone delimited by the event descriptor and subgroup identified in the descriptor (940), generates event notification messages using the event descriptor (950), transmits event notification messages to the wireless client devices associated with the identified members using addresses from member profiles 730 (960) and awaits the next action (910). It bears noting that server device 600 may, depending on system configuration, either transmit or inhibit transmission of event notification messages to wireless client devices of members who member profiles do not have a reported location.

In some embodiments, the event notification system administrator distributes wireless client devices to members after the system administrator has registered the members with the system. This removes device acquisition, device compatibility and member registration hurdles that can present obstacles to universal participation in the system. In some of these embodiments, the system administrator installs a notification system client on a wireless client device and creates a member profile on the event notification server device for a member, and thereafter distributes the wireless client device to the member. In this way, universal participation in the system may be realized among a closed population to whom wireless client devices are distributed. In other embodiments, a notification system client preloaded on a wireless client device distributed to a member has instructions executable by a processor to automatically create a member profile on an event notification server device.

It will be appreciated by those of ordinary skill in the art that the invention can be embodied in other specific forms without departing from the spirit or essential character hereof. The present description is therefore considered in all respects to be illustrative and not restrictive. The scope of the invention is indicated by the appended claims, and all changes that come with in the meaning and range of equivalents thereof are intended to be embraced therein.

What is claimed is:

1. A notification server system for a wireless event notification system, comprising:
  a network interface;
  a memory configured to store member profiles for members of the notification system wherein individual member profiles identify one or more vocational, academic or social interest subgroups in which individual members are registered, wherein each of the member profiles is uniquely associated with a member of the notification system and a wireless client device, and wherein each of the member profiles is created in the memory before the wireless client device associated with the member profile is distributed to the member; and
  a processor communicatively coupled with the network interface and the memory, wherein the server system is configured to receive via the network interface global positioning system (GPS) locations reported by wireless client devices associated with the members and store the GPS locations in the member profiles, wherein in response to an event descriptor identifying a location of a non-emergency event and one or more vocational, academic or social interest subgroups to which the event pertains and under control of the processor the server system is configured to identify using the member profiles a subset of the members to receive notification of the event based at least in part on a determination that the members in the subset are both registered in one or more interest subgroups identified in the event descriptor and associated with a wireless client device whose last reported GPS location is within a notification zone delimited in the event descriptor and transmit via the network interface event notification messages addressed to wireless client devices associated with the subset of the members.

2. The server system of claim 1, wherein message text in the event notification messages varies based on proximity between a location of the event and reported GPS locations.

3. The server system of claim 1, wherein the event notification messages comprise Short Message Service (SMS) messages.

4. The server system of claim 1, wherein the event notification messages comprise Multimedia Message Service (MMS) messages.

5. The server system of claim 1, wherein the event notification messages are carried in Internet Protocol (IP) packets.

6. The server system of claim 1, wherein the one or more interest subgroups to which the event pertains comprises a vocational subgroup.

7. The server system of claim 1, wherein the one or more interest subgroups to which the event pertains comprises an academic subgroup.

8. The server system of claim 1, wherein the one or more interest subgroups to which the event pertains comprises a social subgroup.

9. The server system of claim 1, wherein the notification zone is delimited by an event location and notification radius in the event descriptor.

10. A wireless client device for use in a wireless event notification system, comprising:
   a user interface;
   one or more wireless interfaces; and
   a processor communicatively coupled with the user interface and the wireless interfaces, wherein under control of the processor the client device acquires global positioning system (GPS) locations of the client device based at least in part on information received via at least one of the wireless interfaces and regulates display on the user interface of message text in a remotely generated event notification message for a non-emergency event based at least in part on a determination of whether the client device is both associated with a member of the notification system who is registered in one or more vocational, academic or social interest subgroups identified in an event descriptor of the event notification message and has a GPS location within a notification zone delimited in the event descriptor, wherein the client device is uniquely associated with a member of the notification system in a member profile created on a notification server system before the client device is distributed to the member, and wherein the client device regulates display of the message text at least in part by transmitting under control of the processor to the server system via at least one of the wireless interfaces a location report having the GPS location, whereby the server system makes the determination and selectively inhibits transmission of the event notification message to the client device based at least in part on the determination.

11. The wireless client device of claim 10, wherein the one or more interest subgroups to which the event pertains comprises a vocational subgroup.

12. The wireless client device of claim 10, wherein the one or more interest subgroups to which the event pertains comprises an academic subgroup.

13. The wireless client device of claim 10, wherein the one or more interest subgroups to which the event pertains comprises a social subgroup.

14. The wireless client device of claim 10, wherein the notification zone is delimited by an event location and notification radius in the event descriptor.

* * * * *